(12) United States Patent
Somashekar et al.

(10) Patent No.: US 11,558,093 B1
(45) Date of Patent: Jan. 17, 2023

(54) DYNAMIC BEAM PATTERN CONTROL USING DEVICE VELOCITY

(71) Applicant: T-Mobile Innovations LLC, Overland Park, KS (US)

(72) Inventors: Sharath Somashekar, Overland Park, KS (US); Nitesh Manchanda, McKinney, TX (US); Vanil Parihar, Overland Park, KS (US); Shruthi Ramakrishna, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/162,805

(22) Filed: Jan. 29, 2021

Related U.S. Application Data

(63) Continuation of application No. 16/841,018, filed on Apr. 6, 2020, now Pat. No. 10,985,821.

(51) Int. Cl.
| | | |
|---|---|---|
| *H04B 7/06* | (2006.01) | |
| *H04L 1/06* | (2006.01) | |
| *H04W 72/04* | (2009.01) | |
| *G01S 11/10* | (2006.01) | |
| *G01S 11/04* | (2006.01) | |

(52) U.S. Cl.
CPC ............ *H04B 7/0617* (2013.01); *G01S 11/04* (2013.01); *G01S 11/10* (2013.01); *H04L 1/0618* (2013.01); *H04W 72/046* (2013.01); *H04W 72/048* (2013.01)

(58) Field of Classification Search
CPC ....... H04B 7/0617; G01S 11/04; G01S 11/10; H04L 1/0618; H04W 72/046; H04W 72/048
See application file for complete search history.

(56) References Cited

U.S. PATENT DOCUMENTS

| | | | | |
|---|---|---|---|---|
| 10,247,816 | B1 * | 4/2019 | Hoffmann | ............... G01S 13/60 |
| 2010/0064193 | A1 * | 3/2010 | Huschke | ................... H04L 1/06 |
| | | | | 714/748 |
| 2017/0164227 | A1 * | 6/2017 | Zwirn | .................... H04W 24/10 |
| 2018/0067203 | A1 * | 3/2018 | Lee | ...................... H04W 56/001 |
| 2020/0059280 | A1 * | 2/2020 | Thurfjell | ................ H01Q 21/28 |

FOREIGN PATENT DOCUMENTS

| | | | | | |
|---|---|---|---|---|---|
| WO | WO-2019103804 | A1 * | 5/2019 | ........... | G01S 5/0036 |
| WO | WO-2021134400 | A1 * | 7/2021 | ............ | H04W 36/32 |

* cited by examiner

*Primary Examiner* — Jaison Joseph
(74) *Attorney, Agent, or Firm* — Shook, Hardy & Bacon, L.L.P.

(57) ABSTRACT

Methods and systems are provided for dynamically adjusting broadcast beam patterns of a wavefront emitted by an antenna array based on the velocities of devices communicatively coupled to the base station associated with the antenna array. The broadcast beam patterns can be adjusted by modifying the broadcast mode or at least one phase, amplitude, or power of the at least one antenna associated with the base station. Adjusting the beam pattern, for example between multiple beams and a single unified beam, based on device types can improve the quality of service for the devices and reduce the processing burden of the base station.

9 Claims, 6 Drawing Sheets

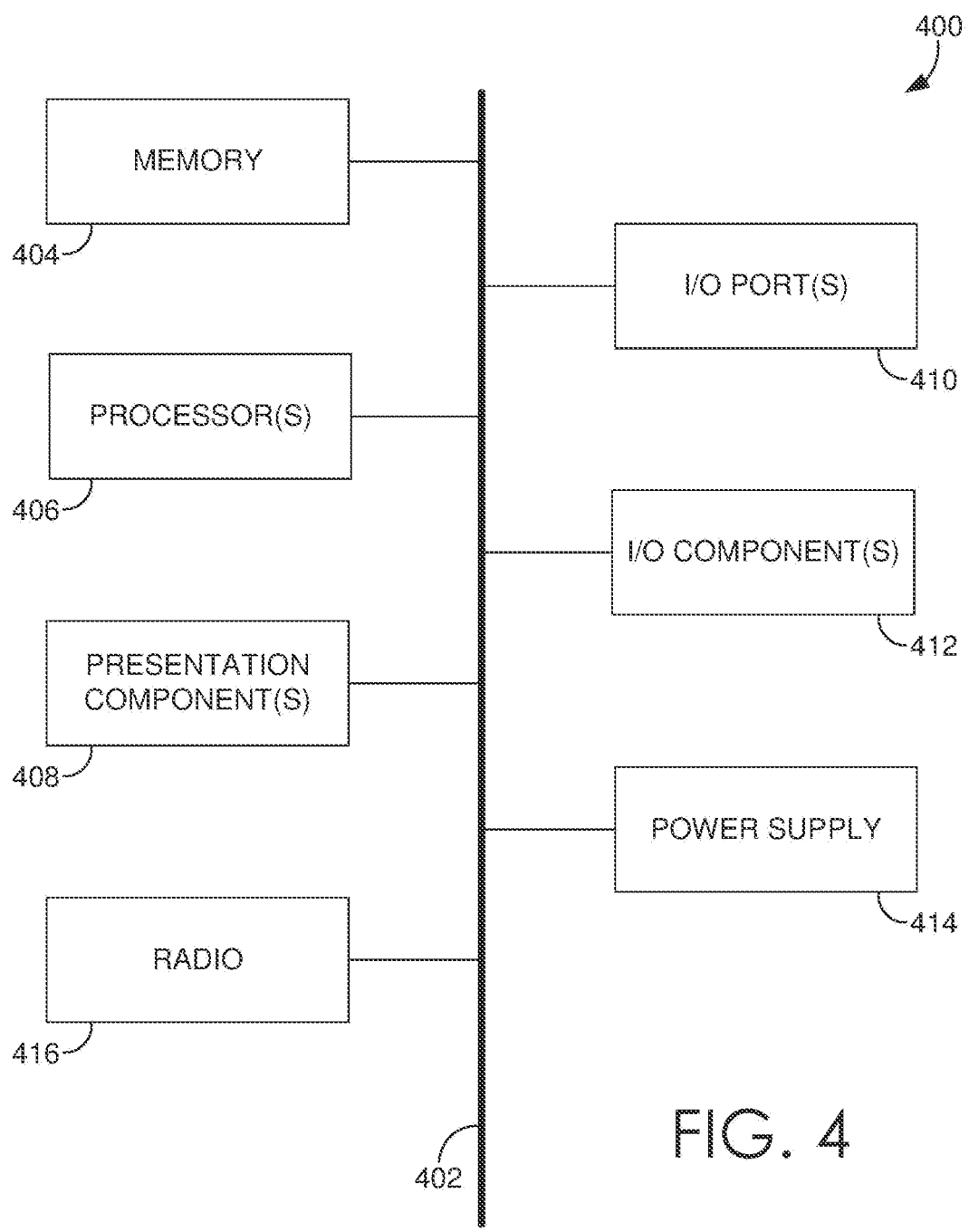

DYNAMIC BEAM PATTERN CONTROL USING DEVICE VELOCITY

CROSS-REFERENCE TO RELATED APPLICATIONS

This application is a continuation of U.S. application Ser. No. 16/841,018, filed on Apr. 6, 2020, the entirety of which is incorporated herein by reference.

SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Traditional telecommunications networks can rely on a predetermined beam pattern, which can be thought of as the shape or shapes of the wavefront emitted by an antenna array. Generally, beam patterns are facilitated using multiple antennas to control the direction of a wavefront by appropriately weighting the amplitude, power, and phase of individual antenna signals. When assembled into an antenna array, the multiple antennas can create multiple individually-identifiable beams, a unified beam, or a combination of the two (hybrid beam). While a properly enabled device, such as a cell phone, is within or at least partially within the beam, the cell phone can connect to a telecommunications network facilitated by the antenna array. However, the usage patterns of devices that can connect with and exchange information with telecommunication networks has revealed limitations in traditional networks. For instance, device use is no longer stationary or even relatively slow. Many innovations have made it possible for users to operate devices at a high velocity or rate of speed (e.g., race car drivers, users aboard a moving aircraft, etc.). When users are traveling at a high rate of speed and using audio, there is a Doppler component associated with the use. In particular, there is a frequency shift when there is a high rate of speed (this happens with sound and light) and the telecommunication system becomes sensitive to Doppler shifts. Accordingly, the present disclosure is directed, in part, to dynamically modifying an antenna's broadcast beam pattern between multi-beam, unified beam, and other patterns based on a device velocity and the resulting Doppler shift associated with a telecommunication network.

For example, some aspects of the present disclosure are directed to methods, systems, and processes of dynamic beam pattern switching based on device velocity and/or Doppler shift. Some embodiments described herein comprise receiving, from a first device at a first time, a first location corresponding to the first device, wherein the first location is within a coverage area associated with a first broadcast beam pattern; receiving, from the first device at a second time, a second location; utilizing the first location at the first time and the second location at the second time, determining a Doppler shift associated with the first device; determining whether the Doppler shift is greater than a predetermined threshold; and upon determining the Doppler shift is greater than the predetermined threshold, modifying the first broadcast beam pattern to generate a second broadcast beam pattern.

Additionally, or alternatively, some embodiments described herein are directed to a system for dynamic beam pattern switching based on device velocity. The system comprises a communication tower comprising at least one antenna array for communication with a first device; a beam pattern allocation component communicatively coupled with the communication tower, wherein the beam pattern allocation component is configured to receive, from the first device at a first time, a first location corresponding to the first device, wherein the first location is within a coverage area associated with a first broadcast beam pattern; receive, from the first device at a second time, a second location; utilize the first location at the first time and the second location at the second time, determining a Doppler shift associated with the first device; determine whether the Doppler shift is greater than a predetermined threshold; and upon determining the Doppler shift is greater than the predetermined threshold, modifying the first broadcast beam pattern to generate a second broadcast beam pattern.

BRIEF DESCRIPTION OF THE DRAWINGS

Illustrative embodiments of the present invention are described in detail below with reference to the attached drawing figures, and wherein:

FIG. 4 depicts a block diagram of an example computing environment suitable for use in implementing embodiments herein.

DETAILED DESCRIPTION

Figure 1:
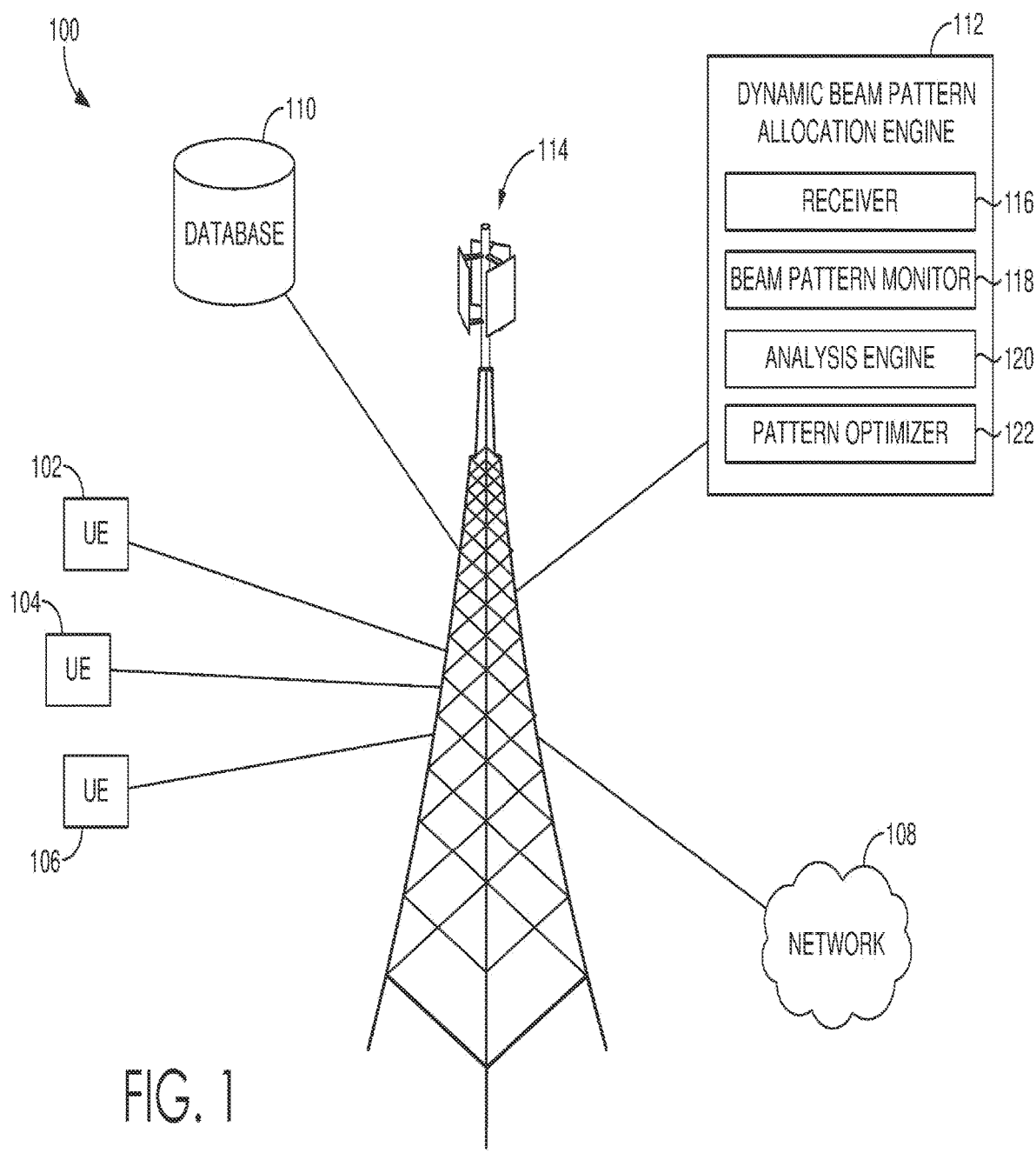
FIG. 1 depicts an example wireless communications network, according to an aspect herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AOA Angle of Arrival
CD-ROM Compact Disk Read Only Memory CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TDOA Time Difference of Arrival
TXRU Transceiver (or Transceiver Unit)
UE User Equipment Further, various technical terms are used throughout this description. An illustrative resource that fleshes out various aspects of these terms can be found in Newton's Telecom Dictionary, 25th Edition (2009).

As used herein, user equipment (UE) (also referenced herein as a user device) can include any device employed by an end-user to communicate with a wireless telecommunication network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE can be, in an embodiment, similar to device 400 described herein with respect to FIG. 4.

Referring to FIG. 1, a network environment suitable for use in implementing embodiments of the present disclosure is provided. Such a network environment as illustrated in FIG. 1 is designated generally as network environment 100. Network environment 100 is but one example of a suitable network environment and is not intended to suggest any limitation as to the scope of use or functionality of the disclosure. Neither should network environment 100 be interpreted as having any dependency or requirement relating to any one or combination of components illustrated.

Network environment 100 includes user devices 102, 104, and 106, access point 114 (which may be a cell site, base station, communication tower, a small cell, or the like), network 108, database 110, and dynamic beam pattern allocation engine 112. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 400 of FIG. 4) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

As previously mentioned, aspects of the present invention are directed to dynamically adjusting beam patterns based on the velocity of UE(s) communicating with the base station. When a UE is traveling at a high velocity, frequency shifts can occur. In 5G systems, which are higher modulation, the system becomes sensitive to Doppler shifts that result from transmissions at high velocities. A high velocity, as used herein, refers to a velocity that exceeds a predetermined threshold. An exemplary threshold can be 80 miles per hour. In a traditional system, for example, assume there are multiple broadcast beams. When serving a user at a high velocity, there is a Doppler component connected to the service. The present disclosure seeks to provide a system that more efficiently adapts to better serve users. In the present disclosure, the system can intelligently identify these high velocity-type situations and dynamically adjust the broadcast beam pattern to accommodate high velocity users and avoid degradation of the quality of the signal. For example, multiple broadcast beams can provide better performance in high speed conditions by eliminating multi-path to some extent by usage of directional beams whereas a single broadcast beam can require less control signaling and lower the CPU utilization when serving slow moving traffic. The switching between the two modes can provide optimal performance without stressing the system.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

Generally, access point 114 is configured to communicate with user devices, such as user devices 102, 104, and 106 that are located within the geographical area, or cell, covered by radio antennas of cell site 114. Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Access point 114 can further comprise or be associated with a database 110. Generally, database 110 comprises structured data maintained by access point 114 or a remote server (not depicted) communicatively coupled with access point 114 via network 108. The structured data can include Doppler frequency lookup tables used to determine a Doppler shift, as discussed herein below. Further, database 110 can include a table or set of tables that include power, amplitude, and phase settings corresponding to potential broadcast beam patterns applicable to one or more antenna arrays associated with access point 114. The power, amplitude, and phase settings can include numerical values (e.g., weights) that can be applied to at least one antenna of an antenna array to modify the wavefront emitted by the at least one antenna of an antenna array.

Dynamic beam pattern allocation engine 112 generally facilitates dynamic beam pattern modifications and comprises components that are utilized to monitor UE type indicators associated with UEs, such as user device 102, 104, and 106 that are communicatively coupled to access point 114. In some embodiments, dynamic beam pattern allocation engine 112 comprises receiver 116, beam pattern monitor 118, analysis engine 120, and one or more pattern optimizers 122. Although depicted in FIG. 1 as distinct from access point 114, in some embodiments dynamic beam pattern allocation engine 112 is a subsystem of access point 114 or communicatively coupled to one or more access points 114 via network 108.

The receiver 116 of dynamic beam pattern allocation engine 112 is generally responsible for receiving information from various UEs, such as user devices 102, 104, and 106, which are within the coverage area of access point 114. The information sent from a particular UE to access point 114 can includes a UE velocity that identifies and corresponds to the particular UE's location and a plurality of points in time. For example, user device 102 can transmit a UE location to access point 114 at a first time and a second location of user device 102 at a second time. Receiver 116 can receive, or otherwise access, the UE velocity and location information associated with user device 102 from access point 114. Similarly, user device 104 can transmit a UE velocity to access point 114 that identifies user device 104 as comprising a smartphone. The information sent from a UE to access point 114 can further comprise channel quality information that includes information on how good or bad the communication channel quality is. Location information may be based on GPS or other satellite location services, terrestrial triangulation, an access point location, or any other means of obtaining coarse or fine location information. Channel quality information may indicate a realized uplink or downlink transmission data rate, observed signal-to-interference-plus-noise ratio (SINR) or signal strength at the user device, or throughput of the connection. Receiving component 116 can receive this data continuously, intermittently, or periodically, such as, for instance, every two to six hours, twice a day, once a day, or once a week. Longer time periods, such as two weeks to three months, and other periods of time are also contemplated in accordance with aspects disclosed herein. The data received during these periods can be used to provide information relating to the UEs (e.g., user devices 102, 104, and 106) connected to access point 114 at a specific point in time or used to acquire historical patterns of UE locations or densities over time.

Beam pattern monitor 118 is generally responsible for determining a first beam pattern emitted by access point 114. As will be discussed below, a first beam pattern may be considered a first beam pattern in time; that is, the first beam pattern is emitted by access point 114 at a time prior to a time that a second beam pattern is emitted. As used herein, the term beam pattern may be considered to be synonymous with a radiation pattern or RF wavefront at a particular time. The radiation pattern or RF wavefront can be facilitated by manipulating the amplitude, phase, power, or any combination thereof of the signals emitted by one or more antenna arrays included in access point 114 and may be considered to have a 3D shape in the x, y, z planes. For example, a beam pattern can include multiple individually-identifiable beams or a unified beam. Beam pattern monitor 118 can determine the beam pattern of access point 114 by detecting a predefined broadcast mode or the amplitude, phase, and power of the antenna array(s) associated with access point 114.

Analysis engine 120 is generally responsible for combining and processing the information for the various UEs received by receiver 116 and comparing it to the first beam pattern emitted by access point 114 as determined by beam pattern monitor 118. In some embodiments, analysis engine 120 considers the UE velocities of the UEs connected to access point 114 and the current beam pattern emitted by access point 114. Analysis engine 120 can also consider any other UE information received by receiver 116. As will be discussed below, analysis engine 120 can activate dynamic beam pattern optimizer 122 based on the analysis of at least the UE velocity and the beam pattern. In embodiments, the UE velocity is further used by the analysis engine 120, for instance, to identify a Doppler shift based on the velocity. This can be evaluated in view of a predetermined threshold. In particular, as the Doppler shift increases the service decreases; thus, a Doppler shift that exceeds a predetermined threshold can trigger generation of a new broadcast beam pattern. An average Doppler shift can be utilized, in embodiments. The velocity UE(s) and Doppler shifts can be identified by any known means in the art including, but not limited to, angle of arrival, time distance of arrival, and the like.

Pattern optimizer 122 is generally responsible for determining a second beam pattern based on the output of analysis engine 120. Said another way, pattern optimizer 122 may determine that the first beam pattern should be modified in any one or more of the x, y, and z planes in order to better serve the UE types communicating with access point 114. The pattern optimizer 122 can determine the phase, amplitude, or power shift necessary for any one or more antenna elements of an antenna array associated with access point 114, to cause the antenna array to emit a second beam pattern. For example, in a case where the first beam pattern comprises multiple individually-identifiable beams, pattern optimizer 122 may determine a modification for the phase, amplitude, or power of at least one antenna element of an antenna array such that, when applied by access point 114, the first beam pattern switches to a second beam pattern such as a unified beam (e.g., a unified RF wavefront). Similarly, in a case where the first beam pattern comprises a unified beam, pattern optimizer 122 may determine a modification for the phase, amplitude, or power of at least one antenna element of an antenna array such that, when applied by access point 114, the first beam pattern switches to a second beam pattern such as multiple individually-identifiable beams (e.g., at least two individual beams). Any number of modifications can be made to the beam pattern resulting in, for instance, a single beam, 2, 4, 8, 16, and 32 individually-identifiable beams. The number of beams emitted is limited by antenna size.

In some embodiments, determination of the phase, amplitude, or power modifications can comprise selection of a set of beam weights from a predetermined list of potential phase, amplitude, or power weights. In an embodiment, the list of potential phase, amplitude, or power weights may be based on phase, amplitude, or power weights applied to a similar antenna array in a testing environment. In an embodiment, the predetermined list of potential phase, amplitude, or power weights may be associated with optimal conditions for implementation, comprising at least one of: location of UEs, number of UEs, antenna array compatibility information, UE type, and balancing rules. Additionally, or alternatively, in some embodiments generation of the phase, amplitude, or power weights may comprise utilizing machine learning models for optimized beam patterns based on historical performance data associated with the location of UEs, number of UEs, and UE types.

In an embodiment, an identification of a Doppler shift above the predetermined threshold can cause a switch from a single beam to multiple beams and an SS block can start broadcasting positions for multiple predefined beams in specific directions. The UE could then select an SS block (beam) that best serves the user by sweeping through the beams (SS block burst). As the traffic pattern changes, the system can return to a single broadcast beam pattern to avoid the overhead associated with multiple broadcast beams.

Figure 2A:
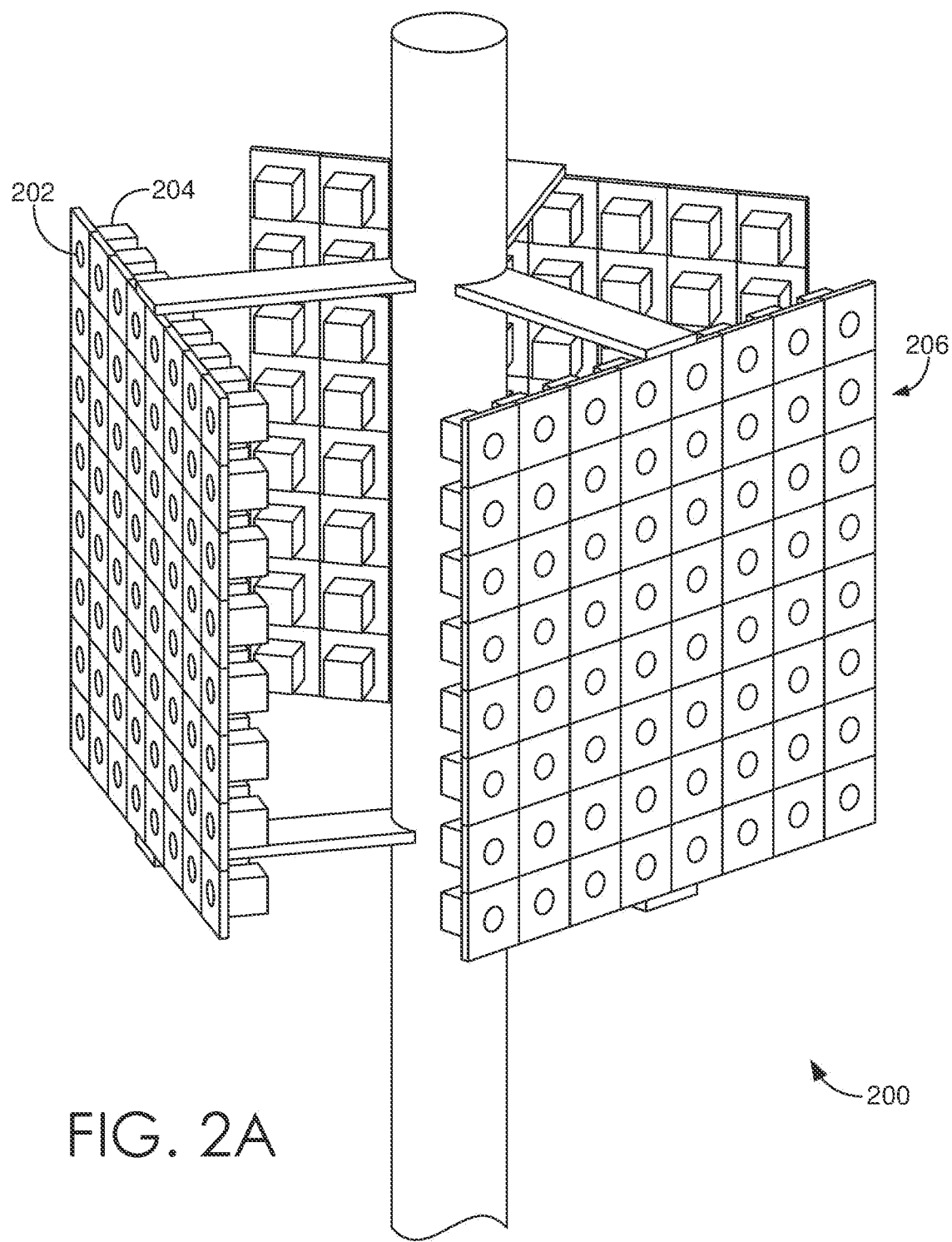
FIGS. 2A-2C each depict an example base station or access point configuration suitable to dynamically switch broadcast beam patterns, according to aspects described herein.
Figure 2B:
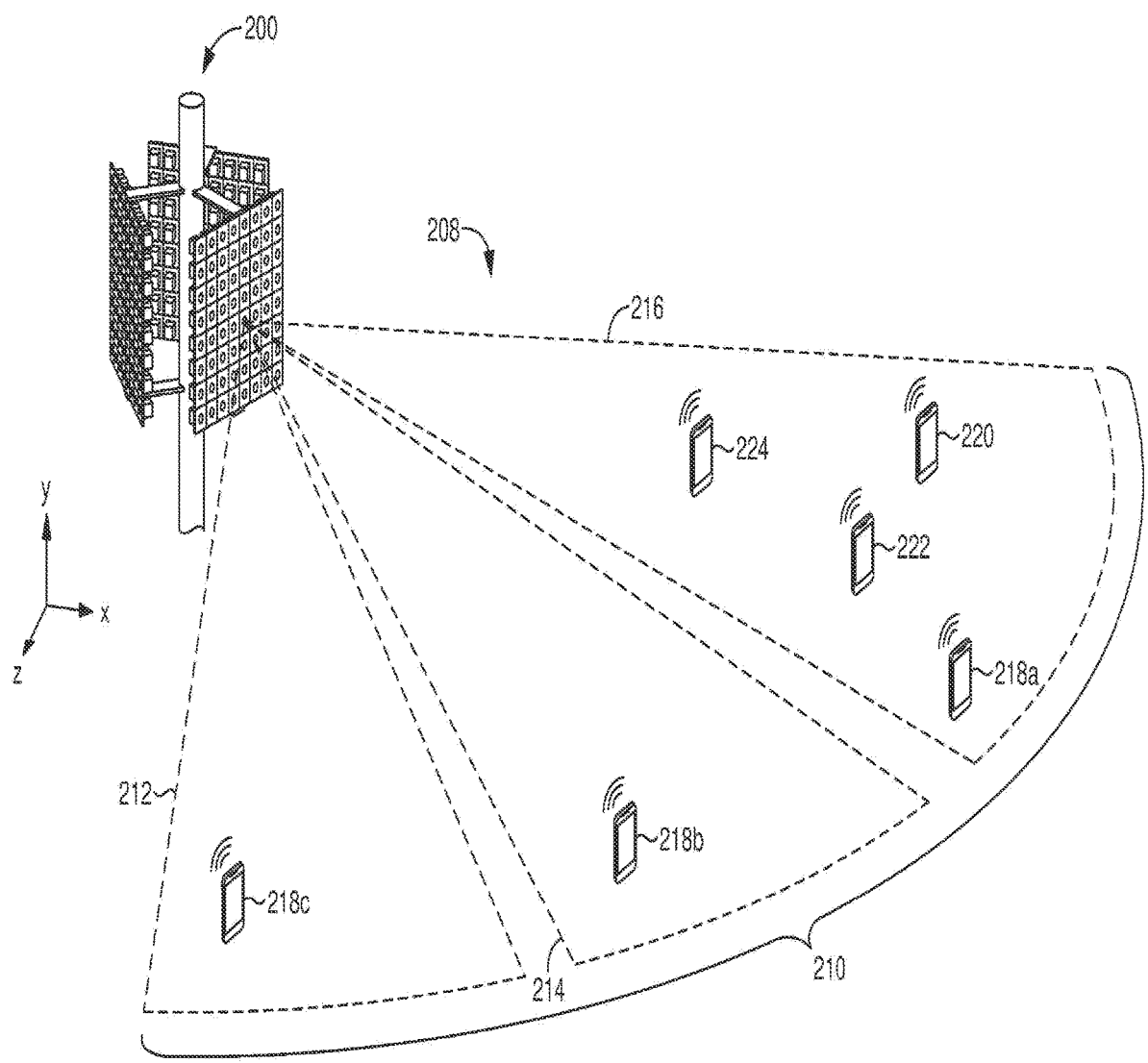
Figure 2C:
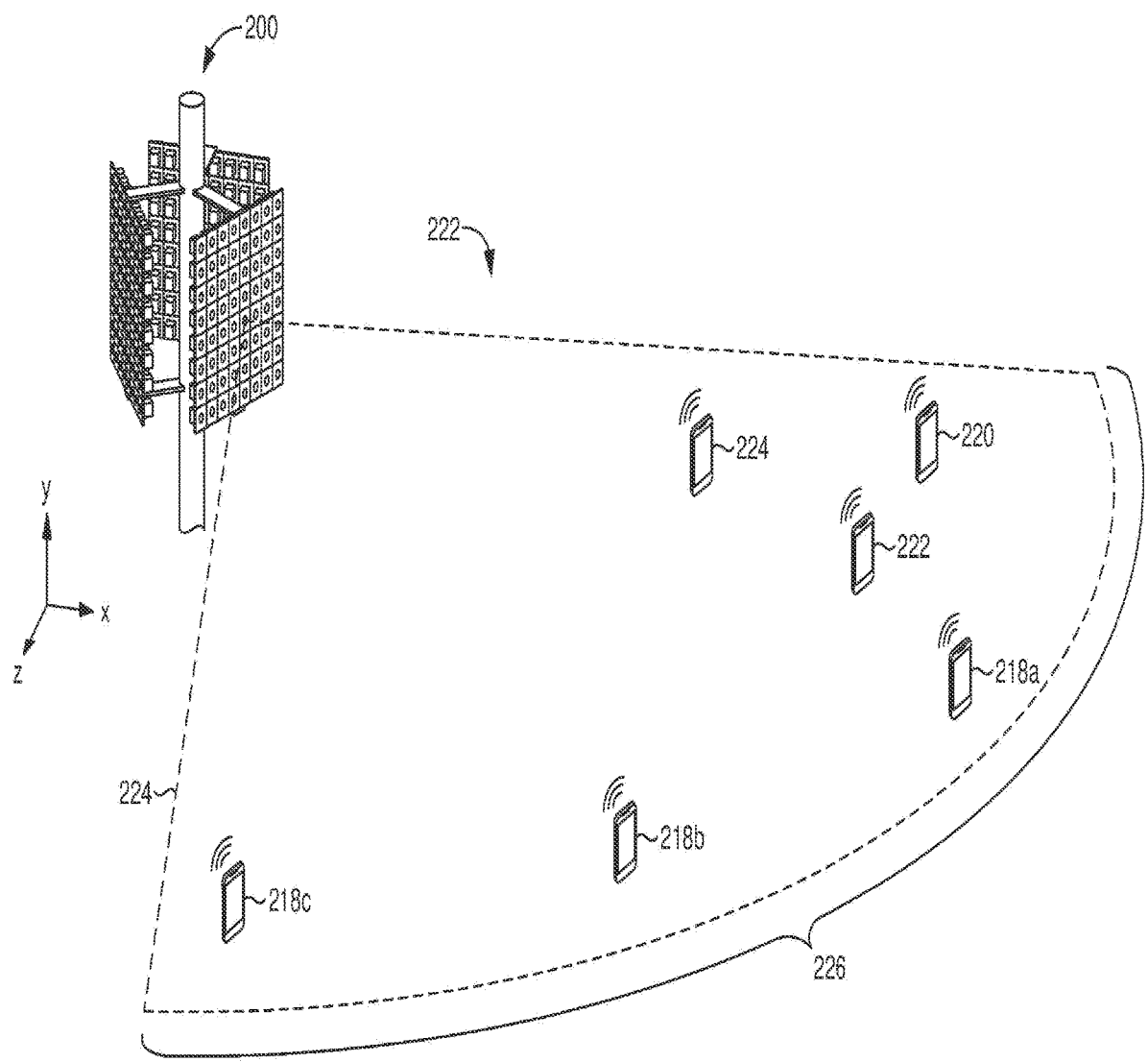

Turning now to FIGS. 2A, 2B, and 2C, an example access point configuration suitable for implementing aspects described herein is provided. Access point 200 is an illustrative example of a configuration that can facilitate dynamic beam pattern adjustments as described herein; however, the depiction of access point 200 is not intended to suggest limitations to the scope of the aspects described herein. Neither should the configuration be interpreted as having any dependency or requirement relating to any one or combination of components illustrated. As such, one skilled in the art will understand that many variations of access point 200 may be made based on the specific implementation or configuration of a particular access point or communication network in view of embodiments described herein.

Access point 200 comprises at least one antenna array 206, each antenna array having one or more antennas 202. In aspects, the one or more antennas 202 may be a dipole monopole, loop, parabolic, traveling-wave, aperture, yagi-uda, conical spiral, helical, conical, radomes, horn, or any combination thereof having a wavelength of ¼, ½, 1, or 1½ for example. In aspects, antenna array 206 may operate in networks such as 3G, 4G, 5G, and 802.11n, and utilize techniques such as MIMO, MU-MIMO, FD-MIMO, massive MIMO, or any combination thereof. It is noted that adjusting one or more of phase, amplitude, or power of at least one antenna of antenna array 206 can be broadly applicable to an antenna array targeting any portion of the RF spectrum (though any lower than VHF may be size prohibitive). In one aspect, the antenna may be configured to communicate in the UHF, SHF spectrum, or a combination thereof; for example, in the range of 1.3 GHz-30 GHz. Example antenna array 206 comprises 64 antennas 202 arranged in an 8×8 structure. In other embodiments, antenna array 206 may comprise antennas 202 arranged in an 8×4, 4×8, or 4×4 configuration. Each antenna 202 or set of antennas 202 of the antenna array 206 comprises a connection to other components of access point 200 that facilitate control of the phase, amplitude, power, or any combination thereof of RF signals emitted by the antenna(s).

Continuing with specific reference to FIG. 2B, an example beam pattern 208 for access point 200 is provided in accordance with aspects described herein. Beam pattern 208 comprises multiple individually-identifiable beams (e.g., beams 212, 214, 216) that facilitate network connectivity for UEs (e.g., user devices 218-224) in area 210. In some embodiments, multiple individually-identifiable beams comprise at least two beams. Beam pattern 208 can be a first beam pattern or a second beam pattern. Although beam pattern 208 is depicted as including a gap between beam 212 and beam 214 and a gap between beam 214 and 216, one skilled in the art will appreciate that these gaps are included to emphasize the distinction between beam pattern 208 and beam pattern 222. As such, the gaps are not necessary and may not exist in some embodiments. Said differently, in some implementations beam 212 can be adjacent beam 214 and beam 214 can be adjacent beam 218. Further, in some implementations the beams of beam pattern 208 can include incidental or intentional overlaps.

With specific reference to FIG. 2C, another example beam pattern 222 for access point 200 is provided in accordance with aspects described herein. The beam pattern 222 comprises a unified beam 224 that facilitates network connectivity for UEs (e.g., user devices 218-224) in area 226. Beam pattern 222 can be a first beam pattern or a second beam pattern.

Referring to the examples provided in FIGS. 2B and 2C, assume, for example, that UEs 220, 222, and 224 are associated with a velocity that is identified as a non-high velocity (i.e., does not exceed a velocity predetermined threshold). Whereas UE 218 is associated with a high velocity. For instance, UE 218 is associated with a first location 218*a*, a second location 218*b* (at a time later than the first location is identified), and a third location 218*c* (at a time later than the first and second locations are identified). Assume for instance, that the environment portrayed in FIGS. 2B and 2C is a race track where UE 218 is traveling at a high velocity (e.g., in a race car) and UEs 220-224 are stationary (e.g., spectators). It may be determined by the dynamic beam pattern allocation engine, for instance, that the beam pattern 208 needs to be adjusted to accommodate UE 218 traveling at a high velocity. In that case, the beam pattern 222 of FIG. 2C can be generated to provide optimal coverage for all UEs within the coverage area.

Figure 3:
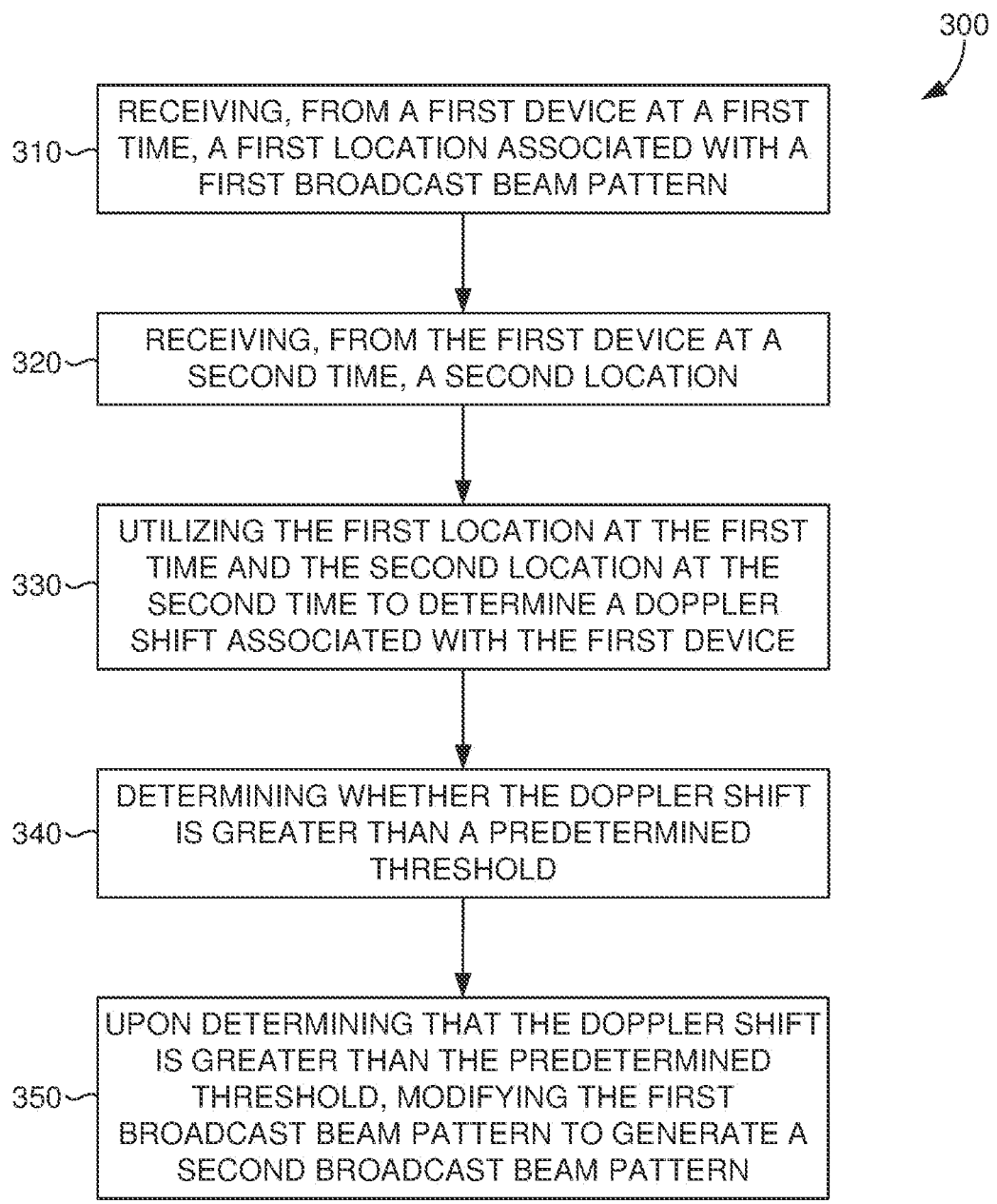
FIG. 3 depicts an example method for dynamically switching broadcast beam patterns based on reported user device types, according to aspects described herein.

Turning to FIG. 3, and with continued reference to FIGS. 2B and 2C, a method 300 for dynamically adjusting beam patterns of an antenna array associated with access point 200 is provided in accordance with aspects disclosed herein. In some embodiments, method 300 can be used for dynamic beam pattern switching in response to sub-optimal beam pattern performance for the UEs traveling at a high velocity currently communicating with access point 200. Sub-optimal beam pattern performance may be detected and dynamic beam pattern switching activated by a specialized system, such as dynamic beam pattern allocation engine 112 described in relation to FIG. 1. Initially, at block 310, a first location corresponding to the first device is received from the first device at a first time. The first location is within a coverage area associated with a first broadcast beam pattern (e.g., a unified beam, two or more individual identifiable beams, etc.). At block 320, a second location is received from the first device at a second time. The second time is a point in time after the first time. At block 330, utilizing the first location at the first time and the second location at the second time, a Doppler shift associated with the first device is determined. At block 340, it is determined whether the Doppler shift is greater than a predetermined threshold. Upon determining the Doppler shift is greater than the predetermined threshold, the first broadcast beam pattern is modified to generate a second broadcast beam pattern at block 350.

In some embodiments, the first beam pattern and UE velocities can be compared to a predetermined set of rules. The predetermined set of rules may be determined by a telecommunication provider based on desired network performance. For example, one provider may determine that the presence of a UE velocity above a predetermined numerical value are best served by a particular beam pattern (e.g., beam pattern 208 or beam pattern 222 or any other beam pattern) regardless of the presence of other UE types. For another example, it may be determined that the presence of a UE velocity equal to or below the predetermined numerical value is best served by second beam pattern (e.g., beam pattern 222 or beam pattern 208 or any other beam pattern). Similarly, a UE associated with the presence of a Doppler shift that exceeds a predetermined threshold may be best served by a particular beam pattern (e.g., beam pattern 208 or beam pattern 222 or any other beam pattern). It will be understood by those skilled in the art that these are merely illustrative examples, and not intended to limit the scope of the embodiments described herein. For example, a given predetermined rule as such, the predetermined set of rules can include any combination of logic rules at least partially based on UE velocity and beam pattern.

The determination or generation of a second beam pattern comprises comparing the predefined broadcast mode or phase, amplitude, and power for the first beam pattern of the antenna array facilitating communication between user devices 218-224 and access point 200 with a predetermined list comprising potential phase, amplitude, and power weights or the predefined broadcast modes for the antenna array. In some embodiments, the second beam pattern is generated based on a set of rules that evaluate the UE velocities and/or Doppler shifts and the predetermined list to identify the optimal phase, amplitude, and power weights or the predefined broadcast mode for the current conditions. Additionally, or alternatively, generating the second beam pattern comprises comparing the antenna array settings of the first beam pattern to phase, amplitude, and power weights determined by machine learned models trained to optimize network performance at least partially based on UE type. In some embodiments, the generated or determined second beam pattern comprises a modification of at least one value associated with the phase, amplitude, or power for at least one antenna of the antenna array facilitating communication between the user devices 218-224 and access point 200. For example, dynamic beam pattern allocation engine 112 can generate the second beam pattern by modifying the phase, amplitude, or power for an antenna, row of antennas, column of antennas, set of antennas, or any combination thereof.

Applying the second beam pattern can comprise dynamic beam pattern allocation engine 112 communicating instructions that when executed by access point 200 cause the wavefront emitted by an antenna array to switch from the first beam pattern to the second beam pattern. For an illustrative example, dynamic beam pattern allocation engine 112 can communicate instructions to access point 200 that cause the beam pattern to switch between beam pattern 208 and beam pattern 222 or switch between beam pattern 222 and beam pattern 208. In some embodiments, the switch from the first beam pattern to the second beam pattern is nearly instantaneous as governed by speed of computer processing, the physical and chemical properties of the antenna array, and the physical properties of RF wavefronts.

Some embodiments of method 300 comprise additional and or alternative blocks. As such, it will be understood by those skilled in the art that method 300 may be repeated periodically, intermittently, continuously, or on demand to facilitate dynamic beam pattern optimization based at least partially on UE types. Further, some embodiments of method 300 may wait a predetermined period of time after block 308 and reapply the original beam pattern (e.g. the first beam pattern) or a default beam pattern. The predetermined period of time may vary based on context. For example, a predetermined period of time may be based on the location of the access point 200, historical data related to UE type communication patterns, or any other metric deemed relevant by the operators of access point 200.

With reference to FIG. 4, computing device 400 includes a bus 402 that directly or indirectly couples the following devices: memory 404, one or more processors 406, one or more presentation components 408, input/output (I/O) ports 410, input/output components 412, and an illustrative power supply 414. Bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an example computing device that can be used in connection with one or more embodiments of the present invention. Distinction is not made between such categories as "workstation," "server," "laptop," "handheld device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 404 includes computer-storage media in the form of volatile and/or nonvolatile memory. The memory may be removable, non-removable, or a combination thereof. Example hardware devices include solid-state memory, hard drives, optical-disc drives, etc. Computing device 400 includes one or more processors that read data from various entities such as memory 404 or I/O components 412. Presentation component(s) 408 present data indications to a user or other device. Example presentation components include a display device, speaker, printing component, vibrating component, etc.

I/O ports 410 allow computing device 400 to be logically coupled to other devices including I/O components 412, some of which may be built in. Illustrative components include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, 5G, or other VoIP communications. As can be appreciated, in various embodiments, radio 416 can be configured to support multiple technologies and/or multiple radios can be utilized to support multiple technologies.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

The invention claimed is:

1. A method of dynamic beam pattern switching based on device velocity, the method comprising:
receiving, from a first device at a first time, a first location corresponding to the first device, wherein the first location is within a coverage area associated with a first broadcast beam pattern;
receiving, from the first device at a second time, a second location;
utilizing the first location at the first time and the second location at the second time, determining a Doppler shift associated with the first device;
determining whether the Doppler shift is greater than a predetermined threshold; and
upon determining the Doppler shift is greater than the predetermined threshold, modifying the first broadcast beam pattern to generate a second broadcast beam pattern by switching from at least a single beam to multiple beams.

2. The method of claim 1, further comprising:
utilizing a velocity of the first device to determine the Doppler shift associated with the first device.

3. The method of claim 2, wherein the velocity is calculated using one or more of an angle of arrival and a time difference of arrival calculation.

4. The method of claim 1, further comprising modifying at least one phase, amplitude, or power of the at least one antenna associated with the telecommunication tower to change the second broadcast beam pattern to a third broadcast beam pattern.

5. A system for dynamic beam pattern switching based on device velocity, the system comprising:
a communication tower comprising at least one antenna array for communicating with a first device;
a beam pattern allocation component communicatively coupled with the communication tower, wherein the beam pattern allocation component is configured to:
receive, from the first device at a first time, a first location corresponding to the first device, wherein the first location is within a coverage area associated with a first broadcast beam pattern;
receive, from the first device at a second time, a second location;
utilize the first location at the first time and the second location at the second time, determining a Doppler shift associated with the first device;
determine whether the Doppler shift is greater than a predetermined threshold; and
upon determining the Doppler shift is greater than the predetermined threshold, modifying the first broadcast beam pattern to generate a second broadcast beam pattern by switching from at least a single beam to multiple beams.

6. The system of claim 5, wherein the beam pattern allocation component is further configured to:

utilize a velocity of the first device to determine the Doppler shift associated with the first device.

7. The system of claim 6, wherein the velocity is calculated using one or more of an angle of arrival and a time difference of arrival calculation.

8. The system of claim 6, further comprising modifying at least one phase, amplitude, or power of the at least one antenna associated with the telecommunication tower to change the second broadcast beam pattern to a third broadcast beam pattern.

9. One or more non-transitory computer-readable storage media having computer-executable instructions embodied thereon that, when executed, perform a method for dynamic beam pattern switching based on a device velocity, the method comprising:

receiving, from a first device at a first time, a first location corresponding to the first device, wherein the first location is within a coverage area associated with a first broadcast beam pattern;

receiving, from the first device at a second time, a second location;

utilizing the first location at the first time and the second location at the second time, determining a Doppler shift associated with the first device;

determining whether the Doppler shift is greater than a predetermined threshold;

upon determining the Doppler shift is greater than the predetermined threshold, modifying the first broadcast beam pattern to generate a second broadcast beam pattern; and switching the antenna array from the first broadcast beam pattern to the second broadcast beam pattern by switching from at least a single beam to multiple beams.

* * * * *